(12) United States Patent
Ippolito

(10) Patent No.: US 10,877,452 B2
(45) Date of Patent: Dec. 29, 2020

(54) METHOD OF MONITORING THE OPERATING STATE OF A PROCESSING STATION, CORRESPONDING MONITORING SYSTEM AND COMPUTER PROGRAM PRODUCT

(71) Applicant: Comau S.p.A., Grugliasco (IT)

(72) Inventor: Massimo Ippolito, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 100 days.

(21) Appl. No.: 16/398,388

(22) Filed: Apr. 30, 2019

(65) Prior Publication Data

US 2019/0339662 A1 Nov. 7, 2019

(30) Foreign Application Priority Data

May 4, 2018 (IT) .................. 102018000005091

(51) Int. Cl.
*G05B 19/042* (2006.01)
*G05B 19/418* (2006.01)

(52) U.S. Cl.
CPC ..... *G05B 19/0428* (2013.01); *G05B 19/4183* (2013.01); *G05B 19/4185* (2013.01)

(58) Field of Classification Search
CPC ............ G05B 19/0428; G05B 19/4183; G05B 19/4185; G05B 23/0227; G05B 19/054; G05B 19/058; G05B 2219/1105; G05B 2219/14006
USPC ....................................................... 700/83
See application file for complete search history.

(56) References Cited

U.S. PATENT DOCUMENTS

| 3,882,305 | A | 5/1975 | Johnstone |
| 4,653,109 | A | 3/1987 | Lemelson et al. |
| 4,831,531 | A | 5/1989 | Adams et al. |
| 4,851,985 | A | 7/1989 | Burror et al. |

(Continued)

FOREIGN PATENT DOCUMENTS

| CN | 1926488 A | 3/2007 |
| CN | 106695072 A | 5/2017 |

(Continued)

OTHER PUBLICATIONS

Italian Search Report for corresponding Italian Patent Application IT TO2014 A 000924, dated Aug. 28, 2015.

(Continued)

*Primary Examiner* — Kenneth M Lo
*Assistant Examiner* — Mohammed Shafayet
(74) *Attorney, Agent, or Firm* — Young Basile Hanlon & MacFarlane, P.C.

(57) ABSTRACT

A method and device of monitoring the operating state of a processing station in an industrial plant. A plurality of limited spatial regions are defined in the station including an actuator which moves an element. Audio sensors and processing units are used to determine a first reference sequence and a second sequence of audio signals of the limited spatial regions during a work cycle. A similarity index is generated based on comparison of the reference and the second sequence which is operable to identify possible anomalies in the station operation during work cycles. In one example, the particular limited spatial region where the anomaly occurs, the actuator or element identified in the anomaly, and the time at which the anomaly occurs can be identified.

13 Claims, 9 Drawing Sheets

(56) References Cited

U.S. PATENT DOCUMENTS

| | | |
|---|---|---|
| 4,888,692 A | 12/1989 | Gupta et al. |
| 5,097,470 A | 3/1992 | Gihl |
| 5,148,363 A | 9/1992 | Sakamoto et al. |
| 5,329,469 A | 7/1994 | Watanabe |
| 5,711,697 A | 1/1998 | Taninaga et al. |
| 5,721,686 A | 2/1998 | Shahraray et al. |
| 5,757,648 A | 5/1998 | Nakamura |
| 5,767,648 A | 6/1998 | Morel et al. |
| 5,796,868 A | 8/1998 | Dutta-Choudhury |
| 5,822,212 A | 10/1998 | Tanaka et al. |
| 5,870,693 A | 2/1999 | Seng et al. |
| 5,929,584 A | 7/1999 | Gunnarsson et al. |
| 5,949,676 A | 9/1999 | Elsley |
| 6,023,667 A | 2/2000 | Johnson |
| 6,114,824 A | 9/2000 | Watanabe |
| 6,138,056 A | 10/2000 | Hardesty et al. |
| 6,166,811 A | 12/2000 | Long et al. |
| 6,185,466 B1 | 2/2001 | Nicewonger |
| 6,212,443 B1 | 4/2001 | Nagata et al. |
| 6,236,896 B1 | 5/2001 | Watanabe et al. |
| 6,272,244 B1 | 8/2001 | Takahashi et al. |
| 6,321,137 B1 | 11/2001 | De Smet |
| 6,330,493 B1 | 12/2001 | Takahashi et al. |
| 6,349,249 B1 | 2/2002 | Cunningham |
| 6,401,011 B1 | 6/2002 | Hashimukai |
| 6,408,252 B1 | 6/2002 | De Smet |
| 6,434,449 B1 | 8/2002 | De Smet |
| 6,507,765 B1 | 1/2003 | Hopkins et al. |
| 6,556,891 B2 | 4/2003 | Hietmann et al. |
| 6,587,750 B2 | 7/2003 | Gerbi et al. |
| 6,665,581 B2 | 12/2003 | Nishida et al. |
| 6,782,294 B2 | 8/2004 | Reich et al. |
| 6,804,580 B1 | 10/2004 | Stoddard et al. |
| 6,807,461 B2 | 10/2004 | Kneifel, II et al. |
| 7,027,893 B2 | 4/2006 | Perry et al. |
| 7,039,484 B2 | 5/2006 | Daferner |
| 7,076,094 B2 | 7/2006 | Chi et al. |
| 7,079,984 B2 | 7/2006 | Eryurek et al. |
| 7,120,832 B2 | 10/2006 | Collins et al. |
| 7,126,732 B2 | 10/2006 | McNeal et al. |
| 7,149,606 B2 | 12/2006 | Krause |
| 7,200,260 B1 | 4/2007 | Watanabe et al. |
| 7,206,449 B2 | 4/2007 | Raskar et al. |
| 7,209,859 B2 | 4/2007 | Zeif |
| 7,233,405 B2 | 6/2007 | Fromherz |
| 7,246,014 B2 | 7/2007 | Forth et al. |
| 7,305,114 B2 | 12/2007 | Wolff et al. |
| 7,321,808 B2 | 1/2008 | Nagamatsu |
| 7,330,777 B2 | 2/2008 | Hashimoto et al. |
| 7,343,222 B2 | 3/2008 | Solomon |
| 7,379,782 B1 | 5/2008 | Cocco |
| 7,409,303 B2 | 8/2008 | Yeo et al. |
| 7,412,861 B2 | 8/2008 | Lohmann |
| 7,502,707 B2 | 3/2009 | Da Silva Neto |
| 7,512,946 B2 | 3/2009 | MacLellan |
| 7,570,795 B2 | 8/2009 | Yu et al. |
| 7,591,078 B2 | 9/2009 | Crampton |
| 7,620,478 B2 | 11/2009 | Fortell et al. |
| 7,623,736 B2 | 11/2009 | Viswanathan |
| 7,676,390 B2 | 3/2010 | Senturk et al. |
| 7,680,753 B2 | 3/2010 | Heisele et al. |
| 7,689,320 B2 | 3/2010 | Prisco et al. |
| 7,739,099 B2 | 6/2010 | Liu et al. |
| 7,751,325 B2 | 7/2010 | Krishnamurthy et al. |
| 7,779,716 B2 | 8/2010 | Dellach et al. |
| 7,819,859 B2 | 10/2010 | Prisco et al. |
| 7,904,205 B2 | 3/2011 | Kobayashi et al. |
| 7,971,181 B2 | 6/2011 | Pabalate et al. |
| 8,073,564 B2 | 12/2011 | Bruemmer et al. |
| 8,098,928 B2 | 1/2012 | Ban et al. |
| 8,335,575 B2 | 12/2012 | Papenfort et al. |
| 8,412,379 B2 | 4/2013 | Gerio et al. |
| 8,428,990 B2 | 4/2013 | Moll et al. |
| 8,612,051 B2 | 12/2013 | Norman et al. |
| 8,843,221 B2 | 9/2014 | Wang et al. |
| 8,849,687 B2 | 9/2014 | Hakim et al. |
| 9,802,286 B2 | 10/2017 | Nishi et al. |
| 10,005,184 B2 | 6/2018 | Gerio et al. |
| 2002/0111702 A1 | 8/2002 | Angel |
| 2003/0198376 A1 | 10/2003 | Sadighi et al. |
| 2004/0013295 A1 | 1/2004 | Sabe et al. |
| 2004/0133382 A1 | 7/2004 | Ban et al. |
| 2004/0148058 A1 | 7/2004 | Johannessen et al. |
| 2004/0225648 A1 | 11/2004 | Ransom et al. |
| 2005/0004707 A1 | 1/2005 | Kazi et al. |
| 2005/0015180 A1 | 1/2005 | Steger |
| 2005/0027504 A1 | 2/2005 | Watanabe |
| 2005/0119863 A1 | 6/2005 | Buikema et al. |
| 2005/0197803 A1 | 9/2005 | Eryurek et al. |
| 2005/0240592 A1 | 10/2005 | Mamou et al. |
| 2006/0101465 A1 | 5/2006 | Kato et al. |
| 2006/0107508 A1 | 5/2006 | Bonse et al. |
| 2006/0276934 A1 | 12/2006 | Nihei et al. |
| 2007/0297890 A1 | 12/2007 | Sjoberg et al. |
| 2008/0015817 A1 | 1/2008 | Hashemian |
| 2008/0021597 A1 | 1/2008 | Merte et al. |
| 2008/0161970 A1 | 7/2008 | Adachi et al. |
| 2009/0088897 A1 | 4/2009 | Zhao et al. |
| 2009/0171505 A1 | 7/2009 | Okazaki |
| 2009/0190826 A1 | 7/2009 | Tate et al. |
| 2009/0210081 A1 | 8/2009 | Sustaeta et al. |
| 2009/0248038 A1 | 10/2009 | Blumenkranz et al. |
| 2009/0268029 A1 | 10/2009 | Haussmann et al. |
| 2011/0022358 A1* | 1/2011 | Han ............... G05B 19/0428 702/183 |
| 2011/0046995 A1* | 2/2011 | Nishimura ......... G06Q 10/0631 705/7.12 |
| 2011/0102186 A1* | 5/2011 | Buchkremer ...... G05B 19/0428 340/679 |
| 2011/0202312 A1* | 8/2011 | Sumi ................... B66B 25/006 702/182 |
| 2011/0320028 A1 | 12/2011 | Penick et al. |
| 2012/0245733 A1 | 9/2012 | Bjorn |
| 2012/0297872 A1 | 11/2012 | Kaiser |
| 2013/0038707 A1 | 2/2013 | Cunningham et al. |
| 2013/0073084 A1 | 3/2013 | Ooga et al. |
| 2013/0338829 A1 | 12/2013 | Schlaich et al. |
| 2014/0067121 A1 | 3/2014 | Brooks et al. |
| 2015/0241871 A1* | 8/2015 | Yoshino ............ G05B 19/4185 702/81 |
| 2016/0036958 A1* | 2/2016 | Logan ................. H04W 68/00 455/414.1 |
| 2016/0239697 A1* | 8/2016 | Nozaka ............... G06Q 10/20 |
| 2016/0283443 A1* | 9/2016 | Michalscheck ..... F16K 37/0025 |
| 2017/0090469 A1* | 3/2017 | Yokochi ............. G05B 23/0272 |
| 2017/0308050 A1 | 10/2017 | Matergia et al. |
| 2018/0284735 A1* | 10/2018 | Cella .................... H04L 1/0002 |

FOREIGN PATENT DOCUMENTS

| | | |
|---|---|---|
| DE | 102007039425 A1 | 2/2009 |
| EP | 0312991 A2 | 4/1989 |
| EP | 1043642 A3 | 8/2005 |
| EP | 1724072 A1 | 11/2006 |
| EP | 1810795 A1 | 7/2007 |
| EP | 3012695 B1 | 10/2017 |
| GB | 949150 A | 2/1964 |
| GB | 2143800 A | 2/1985 |
| GB | 2452635 A | 3/2009 |
| JP | H1177575 A | 3/1999 |
| JP | 2002315963 A | 10/2002 |
| JP | 2003127085 A | 5/2003 |
| JP | 2004017260 A | 1/2004 |
| JP | 2008220553 A | 9/2008 |
| KR | 20060015557 A | 2/2006 |
| WO | 2005001699 A3 | 2/2005 |

(56) References Cited

FOREIGN PATENT DOCUMENTS

OTHER PUBLICATIONS

Mohamed Karim Ettouhami, Human-Robot Collision Avoidance with RFID Sensors Using Fuzzy Logic and Extended Kalman Filter, Applied Mathematical Sciences, vol. 7, 2013, No. 52, 2555-2567.

* cited by examiner

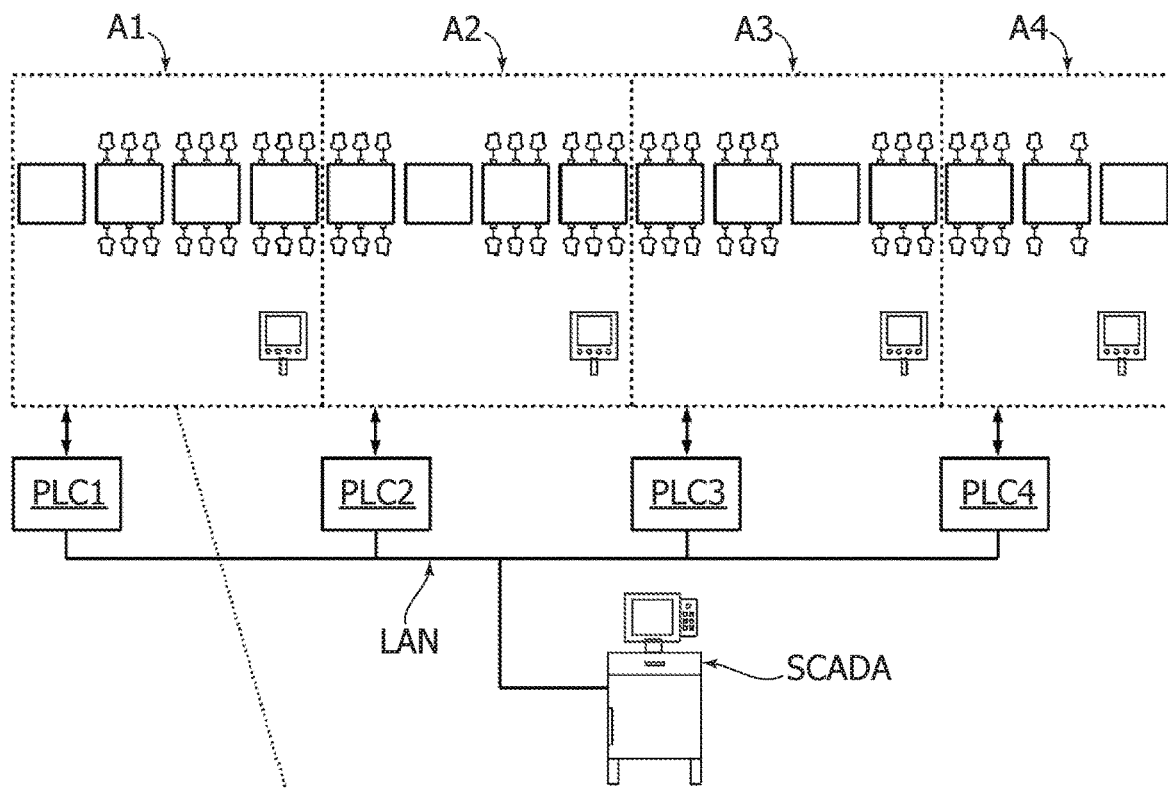
FIG. 1A
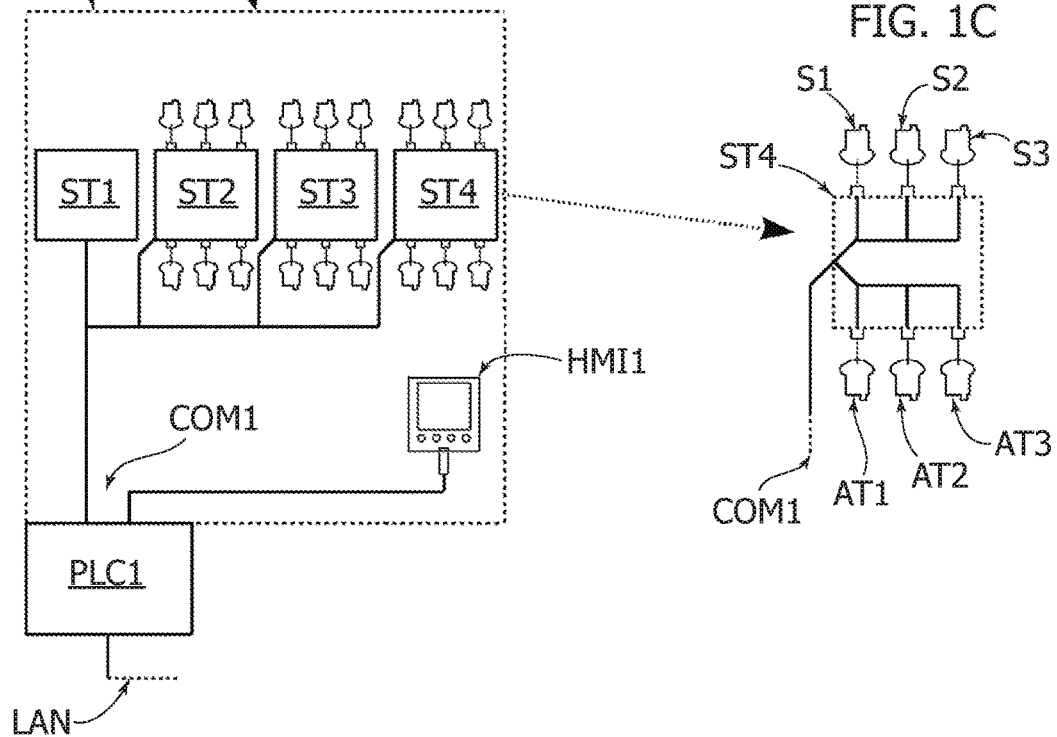
FIG. 1B
FIG. 1C

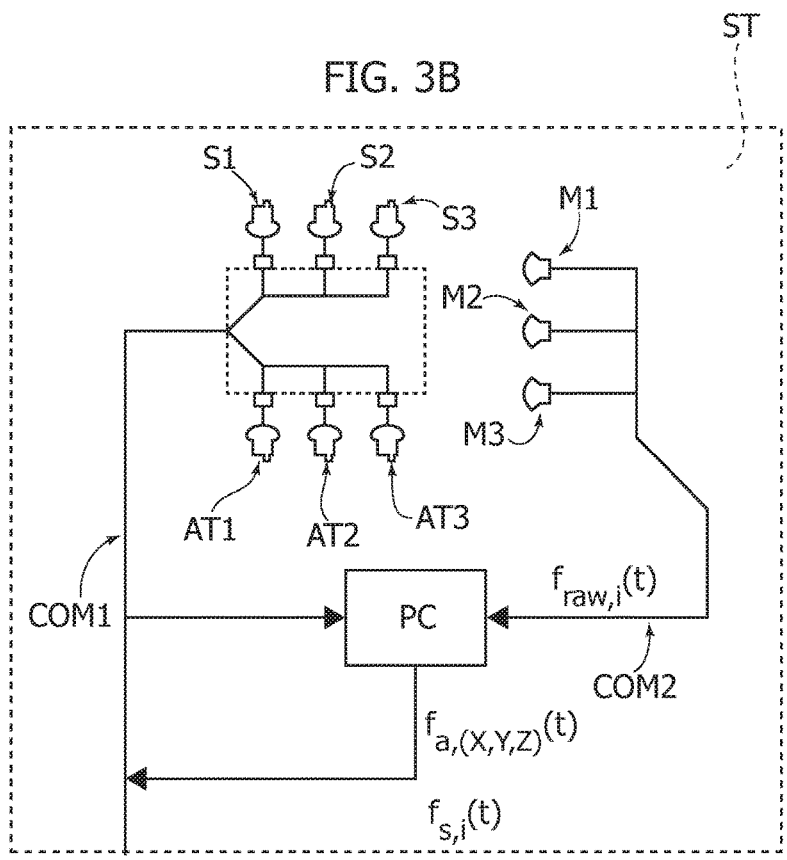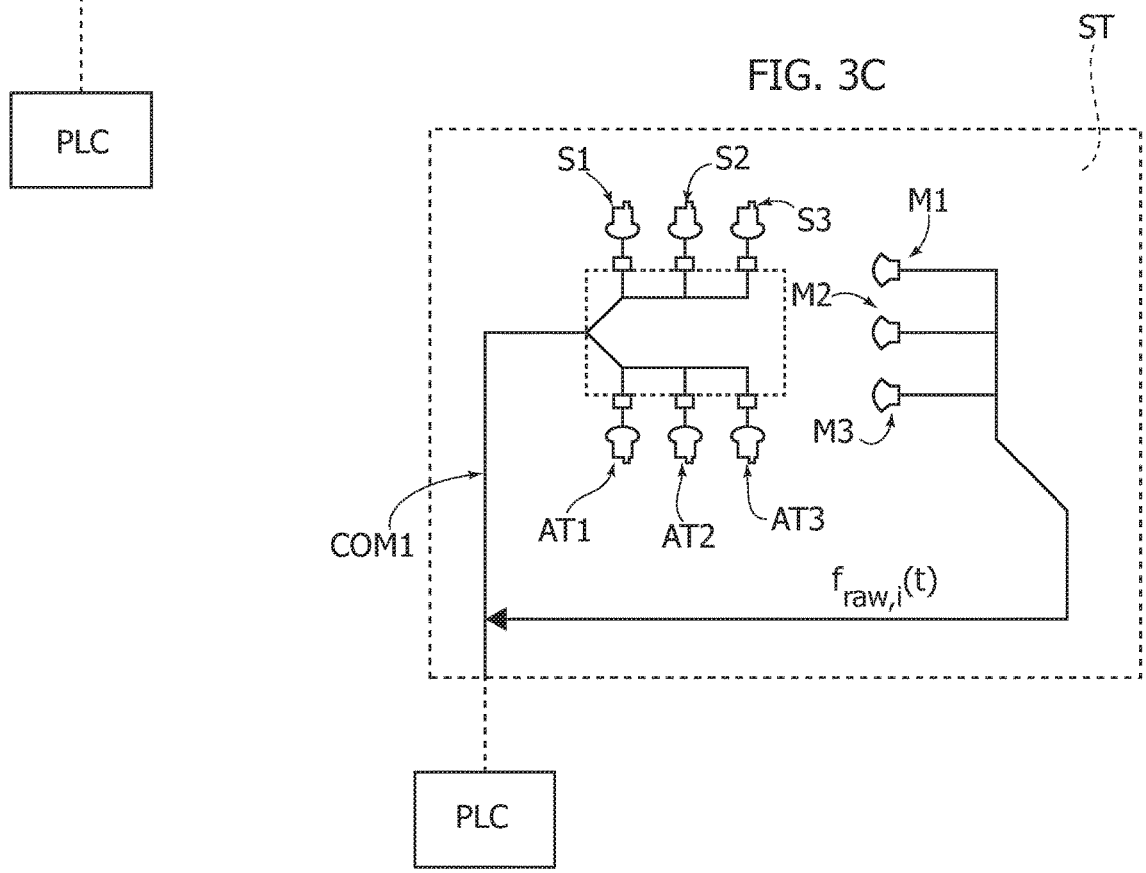

METHOD OF MONITORING THE OPERATING STATE OF A PROCESSING STATION, CORRESPONDING MONITORING SYSTEM AND COMPUTER PROGRAM PRODUCT

CROSS-REFERENCE TO RELATED APPLICATIONS

This application claims priority benefit to Italian patent application number 102018000005091 filed May 4, 2018 the entire contents of which is incorporated by reference.

TECHNICAL FIELD

The embodiments of the present disclosure relate to techniques for monitoring processing and/or assembly stations in industrial plants and/or on assembly lines.

One or more embodiments may be applied, for example, to the monitoring of processing and/or assembly stations via analysis of audio signals detected in proximity to the stations themselves.

BACKGROUND

A layout of an industrial plant 1 or assembly line of a known type, for example for manufacturing structures or components of motor vehicles, is represented in FIGS. 1A, 1B, and 1C.

In general, the plant 1 comprises a plurality of processing and/or assembly stations ST arranged, for example, in cascaded fashion, in which each station ST carries out a certain operation, such as processing of a piece that it receives at input and/or assemblage of pieces that it receives at input. For instance, the plant illustrated in FIG. 1A envisages fifteen stations ST. At the end of the processes carried out in cascaded fashion by the stations ST, the last station supplies the final semi-finished piece at output.

In the example considered, the entire plant 1 is divided into control areas A, such as four areas A1, A2, A3, and A4. As illustrated, for instance, in FIG. 1B, each area A comprises a subset of stations ST. For instance, the first area A1 may comprise the first four stations ST1, ST2, ST3, and ST4. Likewise, the area A2 may comprise the next four stations ST5, . . . , ST8. In general, the number of stations ST may even differ from one control area A to another.

Consequently, the first station ST1 may receive a piece to be processed and/or a number of pieces to be assembled, and carries out its pre-set operation on the piece or pieces at input to obtain a semi-finished piece to be supplied at output. The semi-finished piece at output from the station ST1 is fed at input to a second station ST2, where it is received and possibly clamped in position for the subsequent processing operation envisaged in the station ST2, etc.

Each station ST is typically equipped with at least one actuator AT and/or a sensor S for carrying out and/or monitoring the processes performed in such station ST.

For instance, a processing and/or assembly station may perform one or more operations, such as assembly of some additional parts, welding, quality control on the welds, etc. There may also be envisaged stations that perform exclusively a storage and/or conveying function, such as the stations ST1, ST6, ST11, and ST15, which may, for example, be storehouses or conveyor belts.

Frequently, present in such stations ST are one or more industrial robots for rendering processing faster and of a higher quality. An industrial robot is an automatically controlled, reprogrammable, multi-purpose manipulator, frequently used in industrial automation applications for execution of processes. Typically, the actuator device or means and the sensor device or means of a station ST are on board the industrial robots and allow execution and monitoring of the various processing steps envisaged. Such actuator means on board industrial robots may comprise, for example, one or more electric motors for driving of one or more axes of the robot, whereas the sensor means on board industrial robots may comprise, for example, position sensors, force sensors, etc.

Actuator means and sensor means may also be present in the stations ST that are not equipped with industrial robots, such as the stations that exclusively perform a storage and/or conveying function.

In such cases, for instance in the case of a station comprising a conveyor belt, the actuator means may include, for example, one or more motors that drive the conveyor belt, and the sensor means may include, once again by way of example, one or more sensors (for instance, optical sensors), which detect passage of a piece on the conveyor belt.

The semi-finished piece undergoing the processing operations envisaged by the plant 1 travels through, and possibly stops at, each station ST for a work cycle, i.e., the time necessary for carrying out the processing operation established for that given station. At the end of processing in a station, the piece is unclamped and can proceed along the path towards the next station of the assembly line 1. For this purpose (see, for example, FIG. 1C), typically each assembly station ST is equipped with actuators AT1, AT2, AT3, . . . for execution of the process or processes associated to the station ST and/or with sensors S1, S2, S3, . . . for acquisition of parameters on the status of the station.

Typically, the stations ST of a control area A are monitored and/or controlled by devices or means of a human-machine interface (HMI) unit. For instance, the first control area may have associated to it a fixed human-machine interface unit HMI1. In particular, in order to control the stations ST, each fixed human-machine interface unit HMI is connected, typically through a communication network COM, to an electronic control and processing unit PLC, such as a programmable-logic controller (PLC). For instance, as illustrated in FIG. 1B, the interface HMI1 can be connected to the unit PLC1 through a communication network COM1.

The electronic control and processing unit PLC is in turn connected to the stations ST of the associated area A, in particular (see FIG. 1C) to the actuators AT and to the sensors S of the associated stations ST. For instance, for this purpose, a communication network may be used, such as the network COM1, which is used for communication with the associated interface HMI. For example, the above communication network may be an Ethernet network, or a CAN (Controller Area Network) bus, or in general any wired or wireless communication network.

Moreover, the electronic control and processing unit PLC is typically connected to a smart terminal SCADA (Supervisory Control and Data Acquisition), which performs remote monitoring of the entire assembly line 1. For instance, for this purpose a communication network may be used, such as a LAN network, preferably wired, for example an Ethernet network.

In general, one or more of the human-machine interface units HMI and/or the smart terminal SCADA may be implemented also with mobile devices, such as tablets, on which an appropriate application is installed. For instance, reference may be made to document EP 3 012 695, which describes various solutions for controlling and/or monitoring an industrial plant 1.

Therefore, in general, the plant 1 previously described comprises a plurality of processing and/or assembly stations ST, for example for structures or components of motor vehicles. One or more electronic control and processing units PLC are associated to the processing and/or assembly stations ST, for control of at least one actuator AT and/or sensor S associated to the station. Finally, at least one device may be provided configured for monitoring and/or controlling the processing and/or assembly stations ST through at least one electronic control and processing unit PLC.

FIG. 2 shows a possible work cycle carried out within a processing station ST configured for welding a metal sheet. For instance, the station ST may comprise three actuators AT1, AT2, and AT3, where:

the actuator AT1 is a motor of a conveyor belt;

the actuator AT2 is a motor that displaces an electrode; and the actuator AT3 is an inverter that supplies a current to the electrode.

For monitoring and driving operation of the station, the station ST may also comprise a plurality of sensors, such as:

a sensor S1 configured for detecting whether the metal sheet has reached a certain position;

a sensor S2 configured for detecting the force with which the electrode is pressed against the metal sheet to be welded; and a sensor S3 configured for detecting whether the electrode has reached an end-of-travel/resting position.

For instance, at an instant t0 the motor AT1 is activated, and the conveyor belt advances displacing the metal sheet that is on the conveyor belt (step O1). At an instant t1 the sensor S1 indicates that the metal sheet has reached a certain position. At this point, the motor AT1 is deactivated, and the motor AT2 is activated, thus stopping the conveyor belt and displacing the electrode towards the metal sheet until the sensor S2 indicates, at an instant t2, that the force with which the electrode is pressed against the metal sheet has reached a desired threshold (step O2). Consequently, at the instant t2, the motor AT2 may be deactivated and the current generator AT3 may be activated, thus activating welding (step O3). In the example considered, the welding operation has a fixed duration; i.e., the current generator AT3 is turned off at an instant t3, where the duration t3-t2 between the instants t2 and t3 is constant. Moreover, up to an instant t4, where the duration t4-t3 between the instants t3 and t4 is constant, the metal sheet still remains clamped (step O4). At the instant t4, the motor AT2 is then once again activated (in the opposite direction), until the sensor S3 indicates that the electrode has reached the end-of-travel position (step O5), at the instant t5. Consequently, from the instant t5, a new work cycle can start, where the same operations are carried out on another sheet.

In many applications, the problem is posed of monitoring operation of a work cycle comprising a sequence of operations, for example the operations O1-O5 described with reference to FIG. 2, in such a way as to detect faulty behaviour of the processing and/or assembly station ST.

For instance, document U.S. Pat. No. 5,148,363 describes a system for monitoring a vehicle production line. In particular, the various operations are grouped into blocks of operations, and the system monitors the time for completion of each block of operations. Next, the current completion time is compared with a reference limit (or an upper limit and a lower limit) that takes into consideration the standard deviation of previous completion times.

Instead, document EP 0 312 991 A2 describes a solution in which operation of a plant is monitored by analysing the plots of binary signals exchanged between the various operation blocks, i.e., the actuators AT and sensors S, and the controller PLC. Basically, document EP 0 312 991 A2 envisages storing, during normal operation, a reference pattern for each signal monitored and subsequently this reference pattern is compared with the current signal in order to detect malfunctioning.

SUMMARY

The object of various embodiments of the present disclosure are new solutions that allow better monitoring operation of a processing and/or assembly station, such as a station in an assembly line for manufacturing structures or components of motor vehicles.

According to one or more embodiments, the above object is achieved by means of a method having the distinctive elements set forth specifically in the claims that follow.

One or more embodiments may refer to a corresponding monitoring system.

One or more embodiments may refer to a corresponding computer program product, which can be loaded into the memory of at least one processing unit and comprises portions of software code for executing the steps of the method when the product is run on a processing unit. As used herein, reference to such a computer program product is to be understood as being equivalent to reference to a computer-readable means containing instructions for controlling a processing system in order to coordinate execution of the method. Reference to "at least one processing unit" is evidently intended to highlight the possibility of the present disclosure being implemented in a distributed/modular way.

The claims form an integral part of the technical teaching provided in the present description.

As explained previously, various embodiments of the present disclosure regard solutions for monitoring the operating state of a processing and/or assembly station.

For instance, an industrial plant may comprise at least one processing and/or assembly station, the processing and/or assembly station comprising actuators for moving at least one element, wherein at least one electronic control and processing unit exchanges one or more signals with the station in such a way that the station carries out a sequence of operations during a work cycle (it will be noted that, for brevity, in the sequel of the present description exclusive reference will be made to "work cycles", where this term is to be understood as comprising also possible cycles of assembly or other cycles of operations performed by a processing and/or assembly station).

In various embodiments, a monitoring system is used for monitoring a plurality of audio signals detected in proximity to a processing and/or assembly station via a plurality of audio sensors, for example an array of microphones arranged in proximity to the station.

For instance, the monitoring system comprises an array of audio sensors and one or more processors, such as the electronic control and processing unit mentioned previously, a unit for processing the operating data of the processing station, a unit for processing the audio signals detected by the audio sensors in the array of audio sensors, etc.

In various embodiments, the aforementioned processing units may be integrated in a single processing unit, such as the aforementioned electronic control and processing unit.

In various embodiments, the monitoring system generates and/or stores a three-dimensional model of the space occupied by the processing and/or assembly station, divided into voxels. Consequently, the monitoring system defines a plurality of limited regions of space (the voxels) at the processing and/or assembly station.

In various embodiments, the aforesaid three-dimensional model of the space occupied by the processing and/or assembly station may, instead, be loaded into the memory of at least one processor of the monitoring system during entry into service of the station, or may form part of the firmware code of the station.

In various embodiments, the monitoring system generates and possibly stores an operating model of the processing and/or assembly station by processing the operating data exchanged between the station and the electronic control and processing unit.

In various embodiments, the monitoring system generates one or more position signals $fp,i(t)$ indicating the positions of respective actuators and/or moving objects in the processing and/or assembly station, for example a semi-finished piece that is moving, for instance during an entire operating cycle of the station. These signals $fp,i(t)$ may be generated by processing the operating data of the station and/or the data obtained from the sensors and/or from the actuators of the station.

In various embodiments, the monitoring system acquires (simultaneously) a plurality of audio signals $fraw,i(t)$, detected, for example, during an operating cycle of the processing and/or assembly station, by an array of microphones arranged in known positions in proximity to the station.

In various embodiments, a first step of processing of the audio signals $fraw,i(t)$ consists in the reconstruction of audio signals $fa,(X,Y,Z)(t)$ associated to the voxels of the three-dimensional model of the region of space occupied by the processing and/or assembly station.

In various embodiments, a second step of the above processing of the audio signals consists in the reconstruction of audio signals $fs,i(t)$ associated to actuators and/or to moving objects in the processing and/or assembly station.

In various embodiments, the monitoring system acquires, during a monitoring interval corresponding, for example, to a work cycle, first sampled sequences of the audio signals $fraw,i(t)$ while the station carries out the sequence of operations in a reference condition.

In various embodiments, the first sampled sequences of the audio signals $fraw,i(t)$ are processed for determining at least one reference sequence of the audio signals $fa,(X,Y,Z)(t)$ for each of the limited regions of space and/or at least one reference sequence of the audio signals $fs,i(t)$ for each of the actuators and/or moving elements.

In various embodiments, the monitoring system then acquires, during a monitoring interval, second sampled sequences of the audio signals $fraw,i(t)$ while the station carries out the sequence of operations in an operating condition.

In various embodiments, second sampled sequences of the audio signals $fraw,i(t)$ are processed for determining at least one second sequence of the audio signals $fa,(X,Y,Z)(t)$ for each of the limited regions of space and/or at least one second sequence of the audio signals $fs,i(t)$ for each of the actuators and/or moving elements.

In various embodiments, the monitoring system compares, for each of the limited regions of space, the reference sequence of the audio signal $fa,(X,Y,Z)(t)$ associated to the respective limited region of space with the second sequence of the audio signal $fa,(X,Y,Z)(t)$ associated to the respective limited region of space.

In various embodiments, the monitoring system compares, for each actuator and/or moving element in the processing station, the reference sequence of the audio signal $fs,i(t)$ associated to the respective actuator and/or moving element with the second sequence of the audio signal $fs,i(t)$ associated to the respective actuator and/or moving element.

In various embodiments, the comparison between reference sequences of the audio signals $fa,(X,Y,Z)(t)$ and/or $fs,i(t)$ and respective second sequences of the audio signals $fa,(X,Y,Z)(t)$ and/or $fs,i(t)$ may be used for determining at least one similarity index for each pair of audio signals $fa,(X,Y,Z)(t)$ and/or $fs,i(t)$.

For instance, in various embodiments, the monitoring system determines, for each pair of audio signals $fa,(X,Y,Z)(t)$ and/or $fs,i(t)$, a frequency similarity index and/or a time similarity index and/or an amplitude similarity index.

In various embodiments, the above similarity index or indices may be used for estimating the operating state of the actuators of the processing and/or assembly station, and/or possible anomalies or faults generated by moving elements in the station.

In various embodiments, an operating anomaly of the processing and/or assembly station in a limited region of space $V(X0,Y0,Z0)$ may be detected as a function of at least one similarity index for the respective pair of audio signals $fa,(X0,Y0,Z0)(t)$. Consequently, in various embodiments, at least one of the limited regions of space that comprises an anomaly is selected, the instant in time when the anomaly occurs is determined, and, as a function of the position signals $fp,i(t)$, there is determined one element of the moving elements that is located in the aforesaid limited region of space selected at the instant in time when the anomaly occurs.

In various embodiments, an operating anomaly of a moving object in the processing and/or assembly station (e.g., an actuator or a moving semi-finished piece) can be detected as a function of at least one similarity index for the respective pair of audio signals $fs,i(t)$.

BRIEF DESCRIPTION OF THE DRAWINGS

One or more embodiments of the present disclosure will now be described, purely by way of non-limiting example, with reference to the annexed drawings, wherein:

FIG. 1A is a schematic diagram of an example of an industrial plant or assembly line of a known type;

FIG. 1B is an enlarged view of a portion of the schematic diagram in FIG. 1A.

FIG. 1C is an enlarged view of a portion of the schematic diagram in FIG. 1B.

FIGS. 3A, 3B, and 3C are schematic diagrams of alternate examples of possible embodiments of a monitoring system of a processing and/or assembly station;

DETAILED DESCRIPTION

In the ensuing description, one or more specific details are illustrated in order to enable an in-depth understanding of the examples of embodiments of the present description. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and consequently do not define the sphere of protection or the scope of the embodiments.

Figure 2:
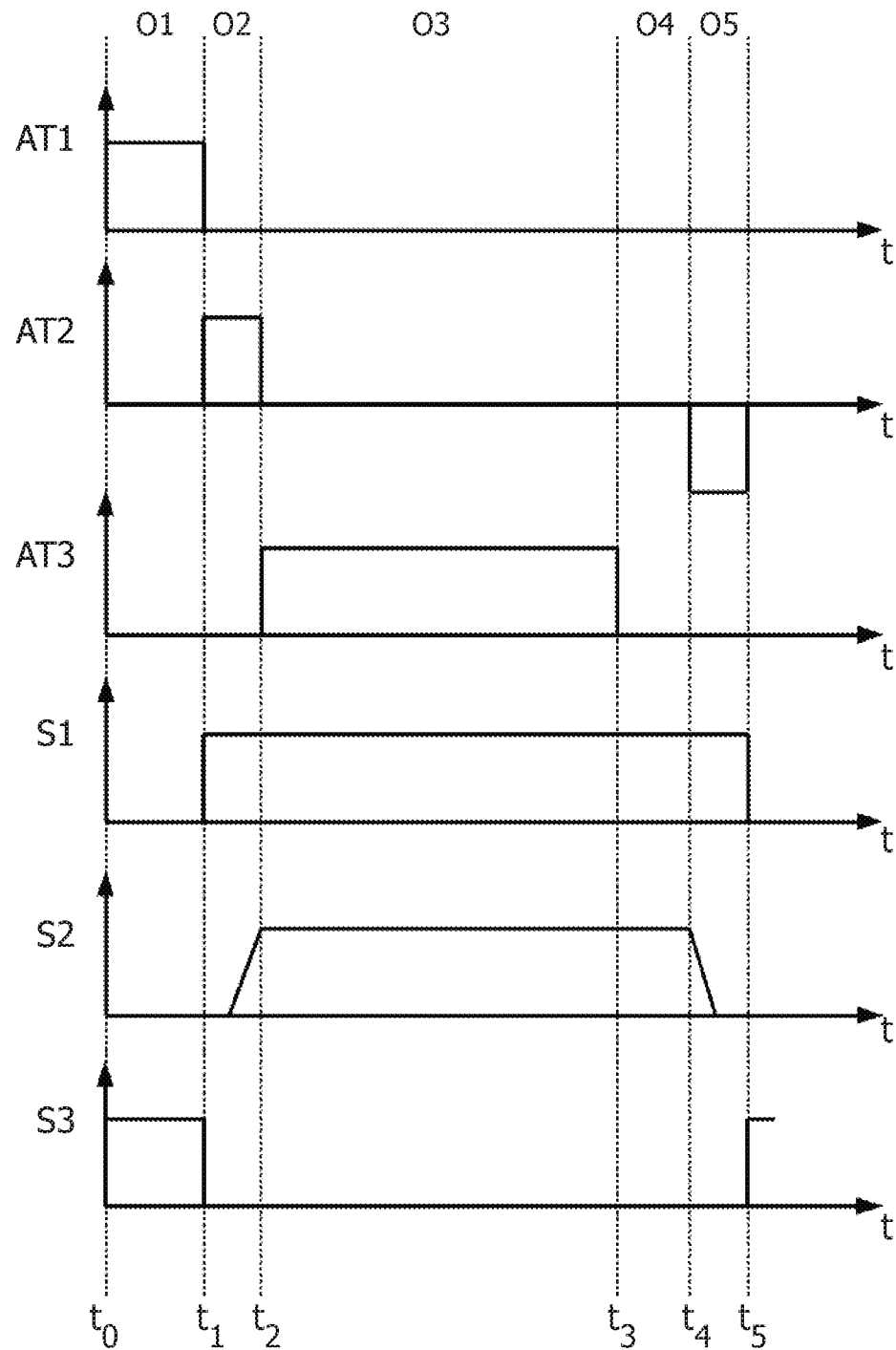
FIG. 2 is a schematic diagram of an example of a work cycle carried out within a processing station.

In the ensuing FIGS. 3 to 9, the parts, elements, or components that have already been described with reference to FIGS. 1 and 2 are designated by the same references used previously in these figures; these elements presented previously will not be described again hereinafter in order not to overburden the present detailed description.

As mentioned previously, the present description provides solutions for monitoring the operating state of a processing and/or assembly station, for example a station comprised in an assembly line for manufacturing structures or components of motor vehicles, as exemplified in FIG. 1.

Also in this case, an industrial plant or production and/or assembly line 1 may comprise a plurality of processing and/or assembly stations ST. The plant may be divided into control areas A, such as four areas A1, A2, A3, and A4, and each area A corresponds to a subset of stations ST. Operation of the stations ST may be controlled and/or monitored via at least one electronic control and processing unit PLC, such as a programmable-logic controller (PLC). In particular, as described previously, these units PLC can communicate with the actuators AT and/or the sensors S of the stations ST to control and/or monitor operation of the stations ST.

In the embodiment considered, the stations ST of the plant 1 also have associated thereto a system for monitoring and control of the stations ST.

Figure 3A:
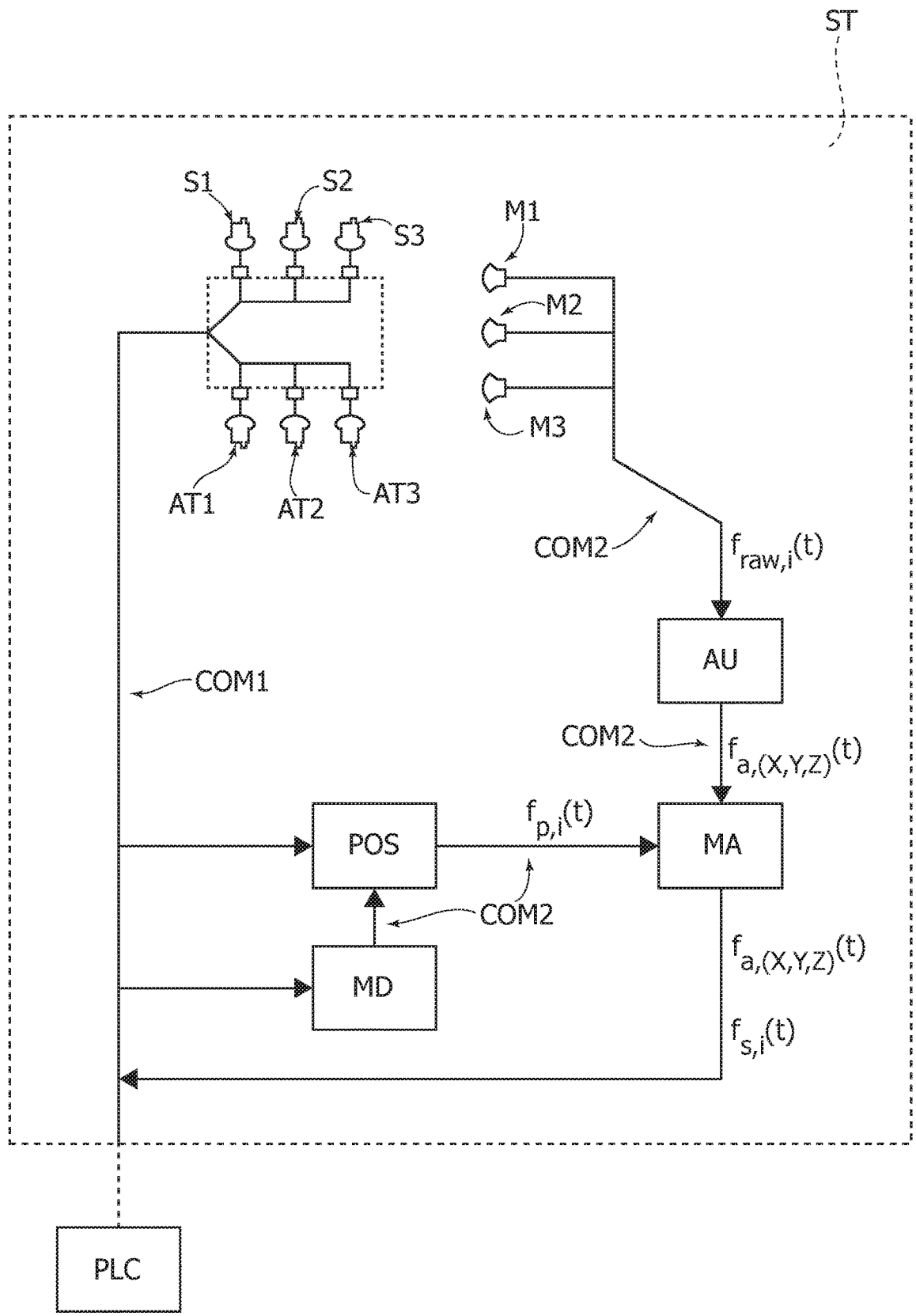

For instance, the architecture of a station ST as exemplified in FIG. 3A envisages, in addition to the actuators AT and to the sensors S already described previously, connected, via the communication network COM1, to the electronic control and processing unit PLC, an array of audio sensors (for example, microphones) M1, M2, M3, . . . arranged in known positions in proximity to the station ST, and further processing units MD, POS, AU, MA of the monitoring system of the station ST.

In the embodiment considered, the processing units MD and POS are connected to the communication network COM1 and are connected together via a (wired or wireless) communication network COM2. The processing unit AU is connected to the microphones M and to the processing unit MA, possibly via the same communication network COM2. The processing unit MA is connected to the units POS and AU, possibly via the communication network COM2, and to the communication network COM1. Consequently, in general, the processing units PLC, MD, POS, MA, and AU are connected together in such a way as to exchange data.

Another embodiment, exemplified in FIG. 3B, envisages, instead of the processing units MD, POS, MA, and AU, a single processing unit PC, connected to the microphones M arranged in known positions in proximity to the station ST and to the communication network COM1, the processing unit PC being configured for integrating the functions of the processing units MD, POS, MA, and AU described hereinafter in the present description.

Yet a further embodiment, exemplified in FIG. 3C, envisages that the microphones M arranged in known positions in proximity to the station ST are connected to the communication network COM1, and that the functions of the monitoring system are performed by the already mentioned electronic control and processing unit PLC.

In yet other embodiments, the functions of the monitoring system can be implemented in one of the processing units already present in the industrial plant 1, for example in a terminal SCADA, or in a distributed way in a number of processing units of the industrial plant 1.

Consequently, in general, the functional blocks MD, POS, MA, and AU described hereinafter may be implemented by devices or means of one or more processing units, for example by means of software modules executed by a micro-processor.

Figure 9:
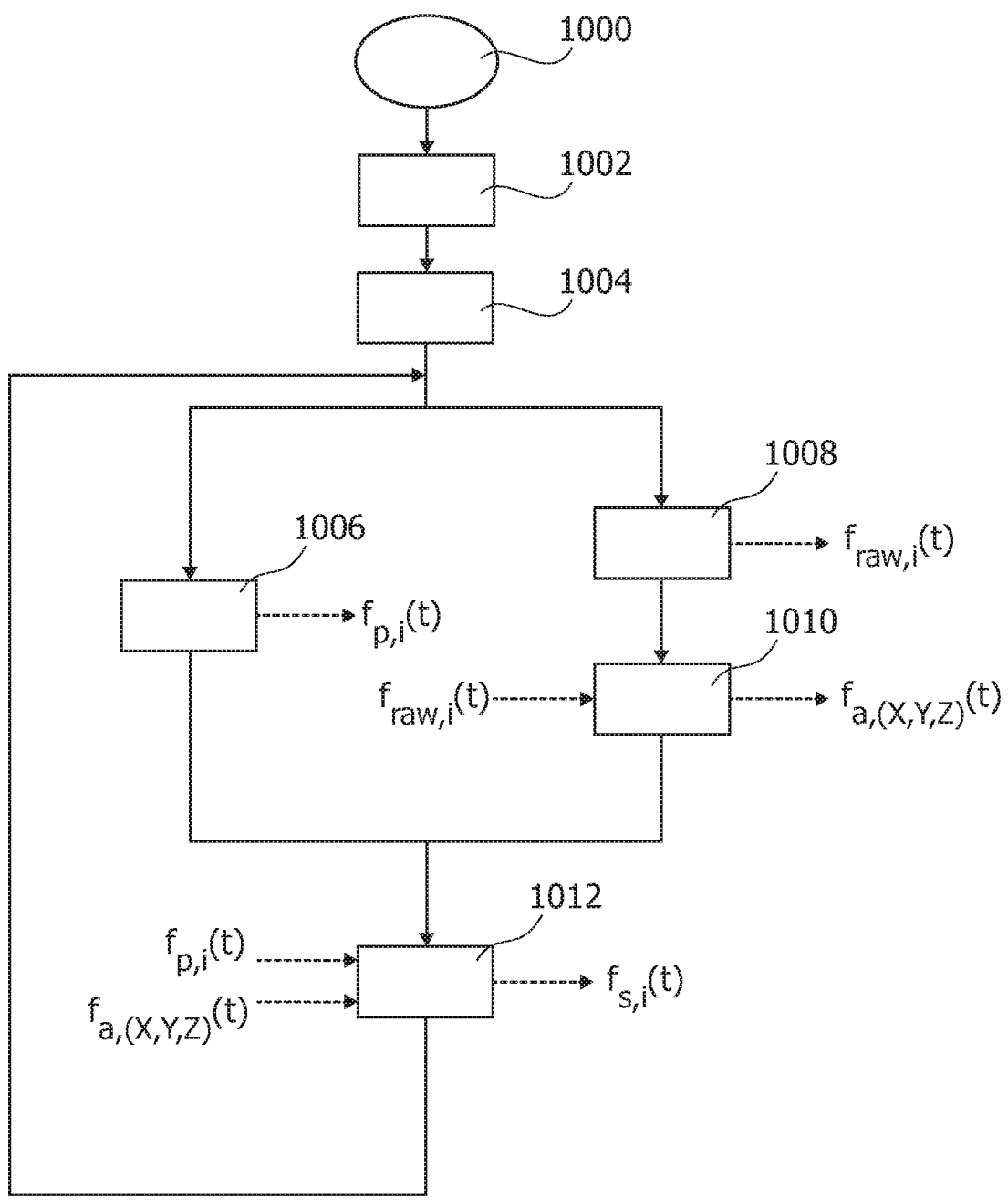
FIG. 9 is a block diagram exemplary of a method of monitoring operation of a processing and/or assembly station.

In order to enable an efficient monitoring of the processing and/or assembly station ST via detection and processing of audio signals detected in proximity to the station ST, FIG. 9 shows a method for analysis of audio signals detected in proximity to a station ST. As mentioned previously, this analysis can be executed, also in a distributed form, within one or more of the processors of the industrial plant 1 discussed previously in relation to FIGS. 3A, 3B, and 3C.

After a starting step 1000, a processor (for example, the processing unit MD of FIG. 3A) generates and possibly stores, in a step 1002, a three-dimensional model of the space occupied by the processing and/or assembly station ST, this space being divided into voxels V.

A voxel V represents a region of the three-dimensional space of finite dimensions (for example, a cube having a side of 10 cm), having a known position with respect to the station ST. Each voxel in this three-dimensional model can be uniquely identified, for example, by a triad of integers (X, Y, Z), according to the notation V(X,Y,Z).

In various embodiments, the three-dimensional model of the space occupied by the station ST can instead be loaded into the memory of at least one processor of the monitoring system of the station ST during entry into service of the station, or may form a part of the firmware code of the station.

Figure 4:
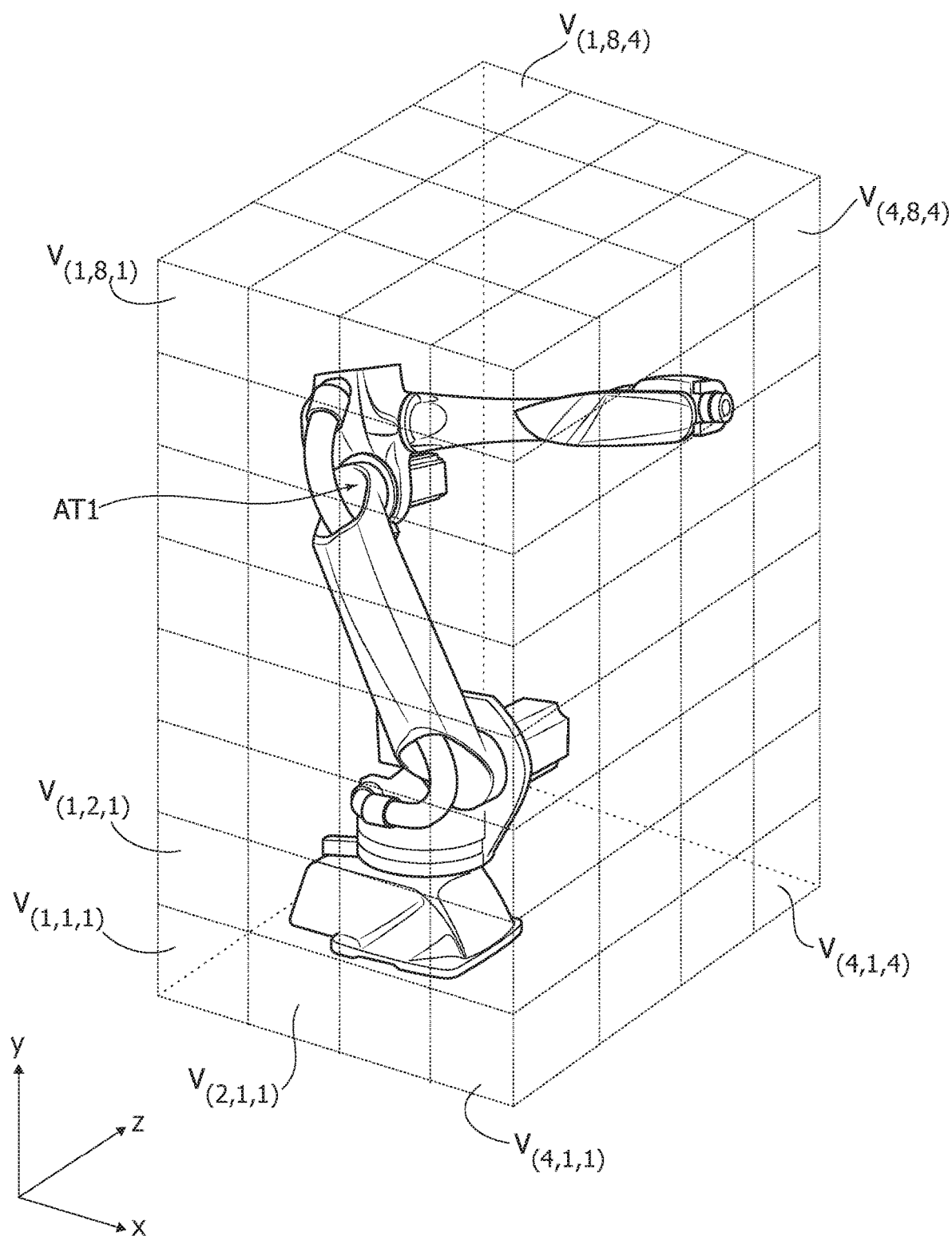
FIG. 4 is an example of a model of division into voxels of a three-dimensional space containing an industrial robot of a processing and/or assembly station.

For instance, FIG. 4 shows by way of example a three-dimensional model of a portion of a processing and/or assembly station ST, corresponding to an industrial robot, and of the space occupied by this, the space being divided into cubic voxels. Consequently, at a given instant, the position of each component of the aforesaid industrial robot can be identified by a respective voxel V. For instance, the position of the actuator AT1 may correspond to the voxel V(2,2,7) at the instant t0, and to the voxel V(3,2,7) at the instant t1 subsequent to the instant t0, the actuator AT1 having moved in the positive direction of the axis x of the three-dimensional model.

This concept of discretisation and modelling of the space is exemplified in FIG. 4 with reference to a single industrial robot exclusively for simplicity of illustration. This concept may be extended to the space occupied by a station ST in its entirety, which comprises, for example, a plurality of industrial robots.

In various embodiments, one or more of the processors of the monitoring system of the station ST (see, for example, the processing unit MD in FIG. 3A, connected to the communication network COM1) may be configured for receiving the operating data exchanged between the actuators AT and/or the sensors S of the station ST and the corresponding electronic control and processing unit PLC, for example, when the station ST carries out the sequence of operations of a certain work cycle in a reference condition.

The above operating data may comprise, for example, signals such as the signals exemplified in FIG. 2, for instance, encoded on the basis of a digital code. The operating data may comprise the instructions imparted by the unit PLC to the actuators AT for performing the respective operations.

In various embodiments, a processor (for example, once again the processor MD of FIG. 3A) may be configured for processing the operating data, generating and possibly storing, in a step 1004, an operating model of the processing and/or assembly station ST for a certain work cycle of the station ST.

The above operating model represents the expected behaviour of the station ST during a certain work cycle. Consequently, given at input an instant t0 of the work cycle of the station ST, the operating model can supply at output information regarding the expected processing step that the station ST is carrying out (for example, one of the steps O1-O5 of FIG. 2), the expected operating state of the actuators AT (for example, position, speed, etc. of the actuators AT1, AT2, AT3, . . . ), and the expected position of the elements moving in the station ST (for example, position, speed, etc., of a semi-finished piece that is travelling through the station ST).

The aforesaid operating model can be generated, for example, by processing the operating data exchanged via the communication network COM1 between the actuators AT and/or the sensors S and the electronic control and processing unit PLC while the station ST carries out the sequence of operations of a work cycle in a reference condition. Additionally or as an alternative, the electronic control and processing unit PLC can send operating data directly to the unit MD.

With reference to FIG. 2, it will be noted that the values of the signals AT may not be sufficient to generate an accurate operating model of the station ST. For instance, the signal AT2 is such that the corresponding actuator AT2 is activated at the instant t1 and deactivated at the instant t2. In case the actuator AT2 has the function of moving a certain element of the station ST, for example an axis of an industrial robot, an interpolation (for example, a linear interpolation) may be necessary for determining the trajectory followed by the aforesaid axis of the industrial robot under the action of the actuator AT2.

Consequently, the operating model of the station ST may contain the expected trajectories of the elements moving within a processing and/or assembly station ST, for example for the duration of an entire work cycle of the station.

In various embodiments, the operating model generated and/or stored by at least one processor of the monitoring system may supply at output, for example, the expected position of an actuator AT of the station ST at a certain instant t0 of the operating cycle of the station ST in terms of voxels V(X0,Y0,Z0). Likewise, also the expected position of a piece travelling through the station ST at a certain instant t0 may be expressed in terms of voxels V(X0,Y0,Z0) by the operating model of the station ST.

The steps 1002 and 1004 can be executed, for example, whenever the station ST is programmed for carrying out a certain set of processes in a certain work cycle. Since the three-dimensional model of the space occupied by the station ST and the operating model of the station ST for a certain work cycle are stored in at least one memory element of at least one processor of the station ST, the steps 1002 and 1004 do not necessarily have to be executed at each action of monitoring of the station, i.e., at each action of sampling of the audio signals detected by the sensors M in proximity to the station ST.

In a step 1006, a processor (for example, the processor POS of FIG. 3a) can process the data supplied by the actuators AT and/or by the sensors S through the network COM1 and/or the data supplied by the operating model of the station ST, to generate signals fp,i(t) indicating the positions of actuators and/or objects moving in the processing station, for example a semi-finished piece that is passing through, for instance during an entire operating cycle of the station.

For example, the value of the signal fp,1(t0) can indicate the position of the actuator AT1 at a certain instant t0 of the operating cycle of the processing and/or assembly station. This position may be expressed, for instance, in terms of a voxel of the three-dimensional model of the space occupied by the station ST that is occupied by the actuator AT1 at the instant t0.

In various embodiments, there may correspond to the elements of the station ST the position of which is fixed during an entire work cycle, such as the electric motors that drive a conveyor belt, a signal fp,i(t) of a value constant in time.

In various embodiments, the number of signals fp,i(t) generated by the monitoring system of a processing and/or assembly station ST is equal at least to the number of actuators AT present in the aforesaid station.

As mentioned previously, in various embodiments, the signals fp,i(t) may be generated by processing one or more signals AT exchanged between the actuators AT and the electronic control and processing unit PLC via the communication network COM1, for example, in case the signal fp,i(t) indicates the position of an actuator controlled by the electronic control and processing unit PLC.

Additionally or as an alternative, in various embodiments, the signals fp,i(t) may be generated by processing one or more signals S detected by the sensors S and exchanged with the electronic control and processing unit PLC via the communication network COM1, for example in case the signal fp,i(t) indicates the position of a piece travelling through the station ST.

Moreover, in various embodiments, the signals fp,i(t) may be generated by processing data supplied by the operating model of the station ST and at least one clock signal of the station ST supplied by the electronic control and processing unit PLC, for example, via the communication network COM1.

Hence, in various embodiments, the signals fp,i(t) may be generated, also in an automatic way, by combining processing of one or more signals AT and/or one or more signals S and/or data supplied by the operating model of the station ST.

It will be noted that the signals fp,i(t) indicate the positions of actuators and/or moving objects in the processing and/or assembly station ST during an effective work cycle, whereas the trajectories of actuators and/or moving objects stored in the operating model of the station ST indicate the expected positions of actuators and/or moving objects in the station.

Figure 5A:
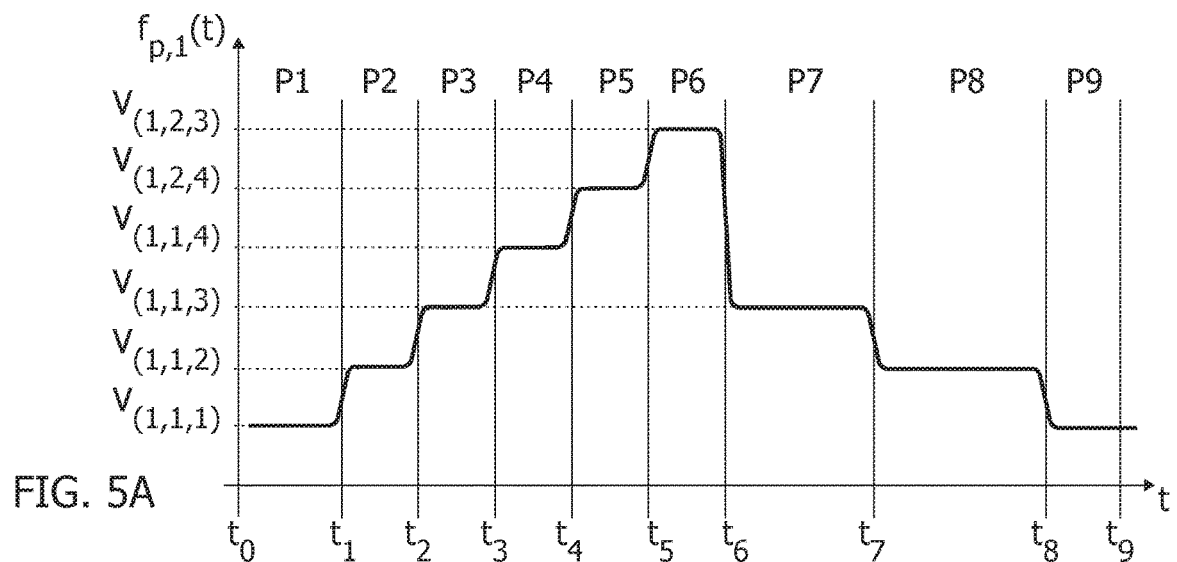
FIG. 5 comprises schematic diagrams FIG. 5A which exemplifies a possible time plot of a signal $fp,i(t)$ indicating the position of an actuator or moving piece in a processing and/or assembly station, and further FIGS. 5B, 5C and 5D which represent components fpX,i(t), fpY,i(t), and fpZ,i(t) of the signal fp,i(t)

FIG. 5A shows by way of example a possible plot of a signal fp,i(t), for instance, the signal fp,1(t) indicating the position of a moving element of the processing and/or assembly station, such as the actuator AT1, during a work cycle of the station ST.

Figure 5B:
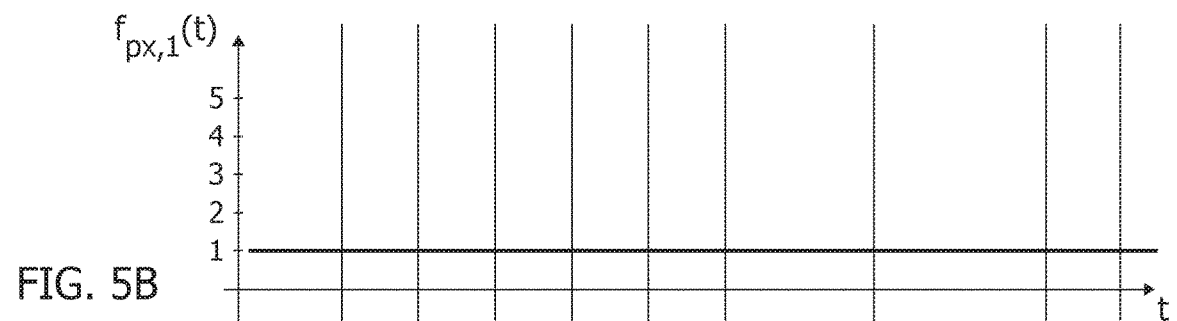
Figure 5C:
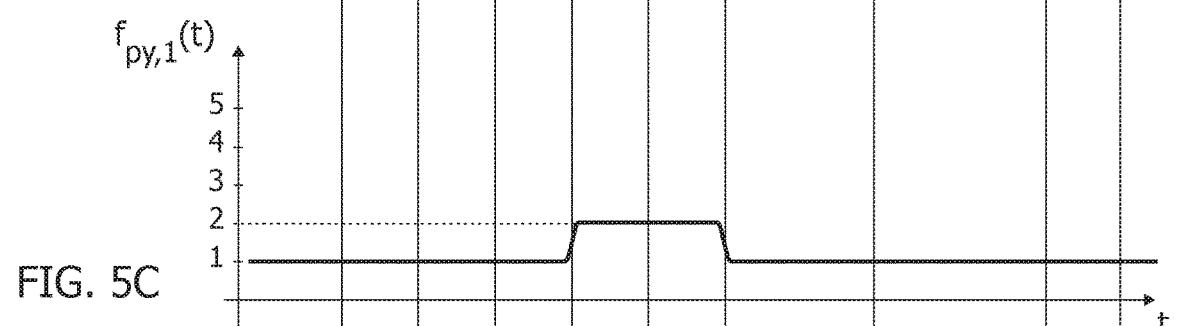
Figure 5D:
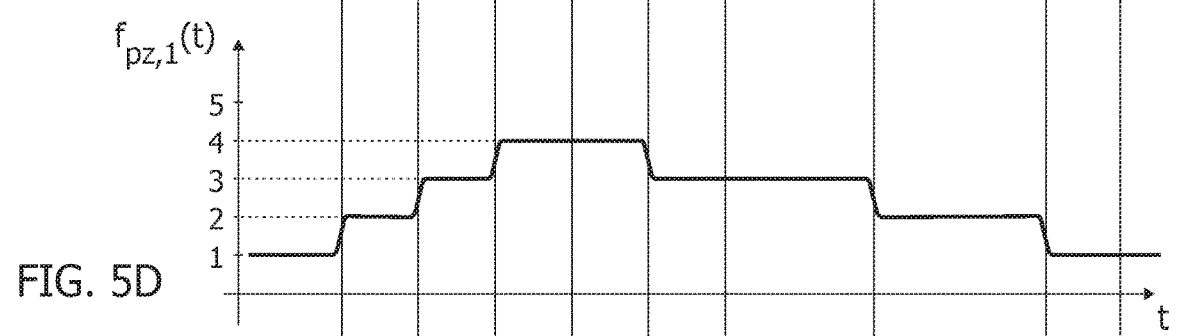

Since the position of a moving element of the processing and/or assembly station can be expressed in terms of voxels identified by a triad (X, Y, Z), it will be understood that this signal fp,i(t) can be displayed as:

a single signal that yields, for each instant in time t0, a respective triad of numbers (X, Y, Z) and hence a respective voxel V(X,Y,Z), as in FIG. 5A; or else a triad of signals fpX,i(t), fpY,i(t), fpZ,i(t), each indicating the motion of the moving element in the respective direction identified by the three-dimensional reference model, as exemplified in portions FIGS. 5B, 5C and 5D corresponding to FIG. 5A.

In said example of FIG. 5, the position of the actuator AT1 initially corresponds to the voxel V(1,1,1). In a first operating step (P1-P4), the actuator AT1 moves in the positive direction of the axis z until it reaches the position corresponding to the voxel V(1,1,4). Once this position has been reached, the actuator AT1 moves in the positive direction of the axis y, reaching the position corresponding to the voxel V(1,2,4) (P5), and then once again along the axis z, in the negative direction, reaching the position corresponding to the voxel V(1,2,3) (P6). From here, the actuator AT1 moves in the negative direction of the axis y and reaches the position corresponding to the voxel V(1,1,3) (P7), and then returns into the initial position V(1,1,1), moving in the negative direction of the axis z (P8-P9).

In a step 1008, executed in parallel to the step 1006, the audio sensors M arranged in known positions in proximity to the station ST acquire (simultaneously) respective audio signals fraw,i(t), for example during an entire operating cycle of the station. The time interval of acquisition of the audio signals fraw,i(t) may correspond to the time interval of the signals fp,i(t).

Figure 6A:
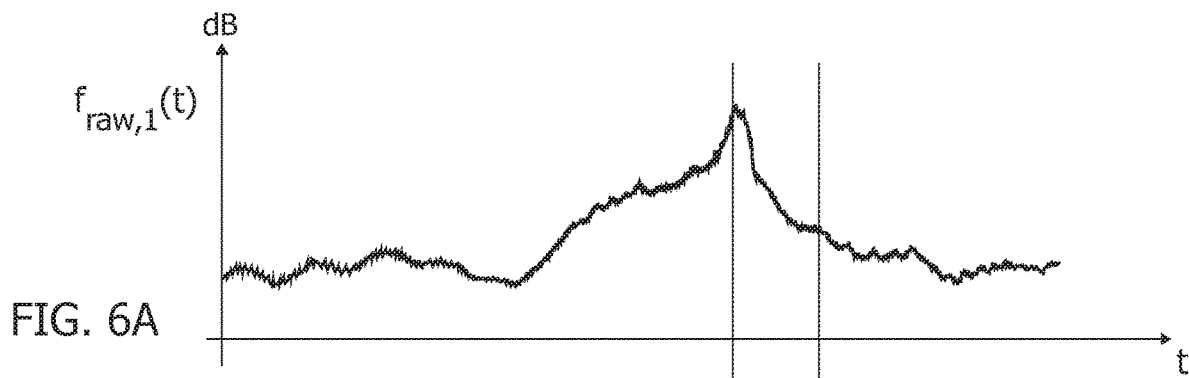
FIG. 6 comprises FIGS. 6A and 6B which exemplify possible time plots of audio signals fraw,1(*t*) and fraw,2(*t*) detected, respectively, by two microphones of the array of microphones of a monitoring system of a processing and/or assembly station.
Figure 6B:
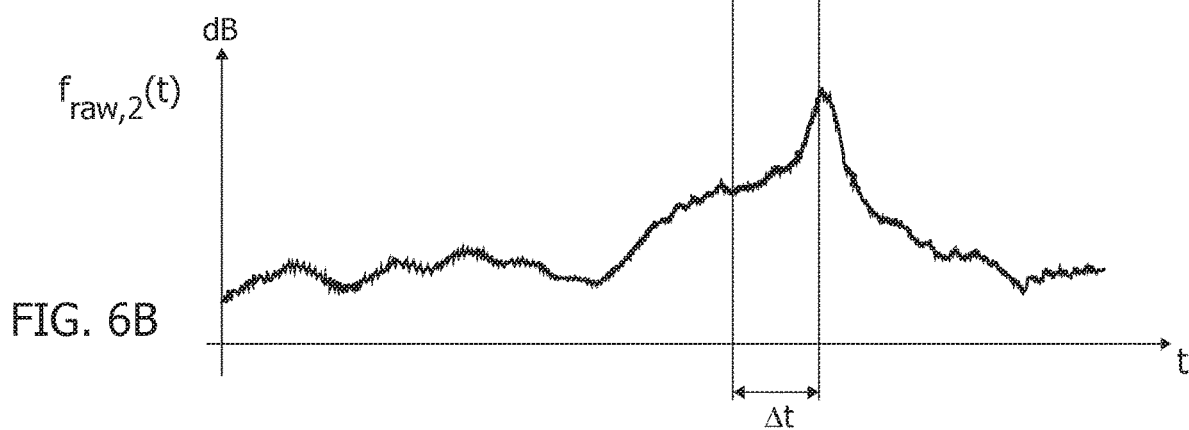

FIG. 6 shows by way of example a possible time plot of two signals fraw,1(t) and fraw,2(t), detected by microphones M1 and M2, respectively, in proximity to the station ST, for example during a work cycle. It will be noted that, when both of the microphones M1 and M2 are in proximity to one and the same processing station ST, the respective audio signals detected may have a similar time plot. In particular, it will be noted, for example, that an intensity peak in the signal fraw,1(t) can be noted also in the signal fraw,2(t), for example with a certain delay Δt.

In various embodiments, the microphones M can be arranged in a two-dimensional array along one side of the station ST. In other embodiments, the microphones M may, instead, be arranged on a number of sides of the station ST, for example on two opposite sides of the station ST. In various embodiments, the microphones may be arranged in a three-dimensional array.

In a step 1010, a processor (for example, the processor AU of FIG. 3A) can process the audio signals fraw,i(t) and generate audio signals fa,(X,Y,Z)(t) associated to the voxels of the three-dimensional model of the region of space occupied by the processing and/or assembly station ST, for example during an entire operating cycle of the station. The time interval associated to the audio signals fa,(X,Y,Z)(t) may correspond with the time interval of the signals fraw,i(t) and/or fp,i(t).

The above audio signals fa,(X,Y,Z)(t) may be obtained, for example, exploiting phase differences between signals detected by microphones in the array of microphones M arranged in proximity to the station ST, for example via beam-forming techniques.

Figure 7:
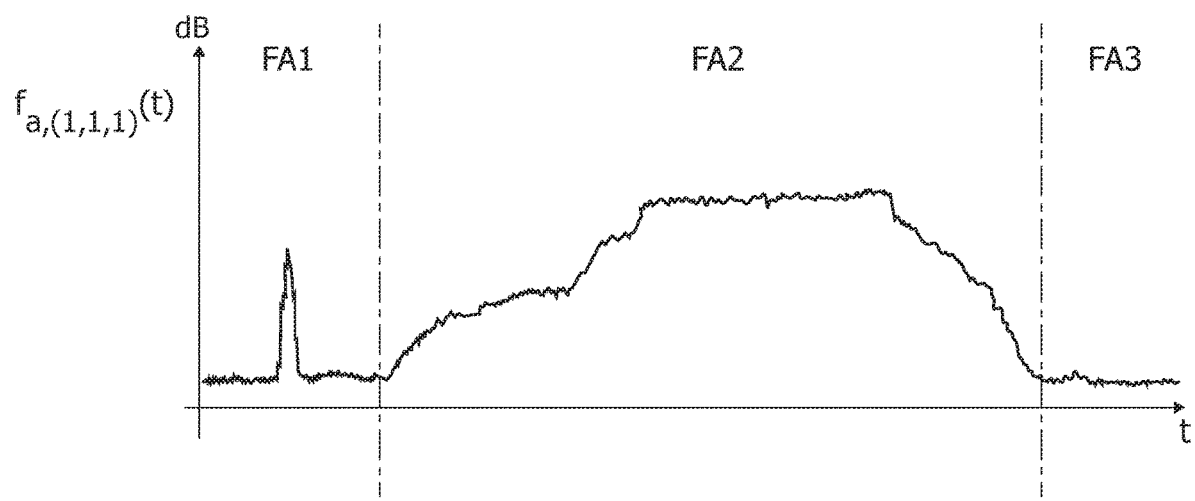
FIG. 7 exemplifies a possible time plot of an audio signal fa,(X,Y,Z)(t)

FIG. 7 shows by way of example the possible time plot of a signal fa,(X,Y,Z)(t), which is generated by processing a number of signals fraw,i(t) and represents the acoustic signature of a certain voxel V(X,Y,Z), for example of the signal fa,(1,1,1)(t) corresponding to the voxel V(1,1,1), for a work cycle of the station ST.

Indicated in FIG. 7 is, for example, a first interval FA1, where the audio signal associated to the voxel V(1,1,1) has an intensity peak of relatively short duration. The intensity peak of the signal fa,(1,1,1)(t) may, for example, be indicative of an actuator AT of the station ST that, as it moves in order to carry out a processing operation, crosses the region of space corresponding to the voxel V(1,1,1).

Once again by way of example, indicated in FIG. 7 is a second interval FA2 in which the audio signal fa,(1,1,1)(t) associated to the voxel V(1,1,1) has an intensity that increases, remains stable, and finally decreases. This plot of the signal fa,(1,1,1)(t) may, for example, be indicative of an actuator AT that enters the region of space corresponding to the voxel V(1,1,1) and remains there for a certain period of time, carrying out a given processing operation envisaged by the work cycle of the station ST, possibly moving, at the end of this processing operation, to return into its initial position.

A third interval FA3 indicated in FIG. 7, where the intensity of the signal fa,(1,1,1)(t) remains at a low level, may be indicative of the fact that in this time interval no element of the station ST travels along, and/or carries out processing operations within, the region of space corresponding to the voxel V(1,1,1).

Techniques for locating acoustic sources that allow reconstruction of audio signals fa,(X,Y,Z)(t) associated to given positions in space by processing audio signals fraw,i(t) detected by an array of microphones M are known in the art and will consequently not be treated any further in the present detailed description.

It will be noted that the number of audio sensors M and/or their positioning in proximity to the processing and/or assembly station ST may vary, even markedly, without this implying any departure from the sphere of protection of the present description. Moreover, the number and/or positioning of the sensors M may affect the spatial resolution and the accuracy of location of the signals fa,(X,Y,Z)(t). For instance, a high number of microphones M may result in a better spatial resolution of the signals fa,(X,Y,Z)(t).

In various embodiments, the spatial resolution (i.e., for example, the size of the voxels) of the discretised model of the three-dimensional space occupied by the station ST generated and/or stored by a processor of the monitoring system can be varied as a function of number and/or positioning of the sensors M.

In various embodiments, in a step 1012, a processor (for example, the processor MA of FIG. 3A) can generate, by correlating signals fp,i(t) and audio signals fa,(X,Y,Z)(t), audio signals fs,i(t) associated to actuators and/or moving objects in the station ST, which represent the behaviour of the aforesaid actuators and/or moving objects during an operating cycle of the station.

In various embodiments, the number of audio signals fs,i(t) generated by processing the signals fp,i(t) and fa,(X,Y,Z)(t) is equal to the number of signals fp,i(t).

Figure 8:
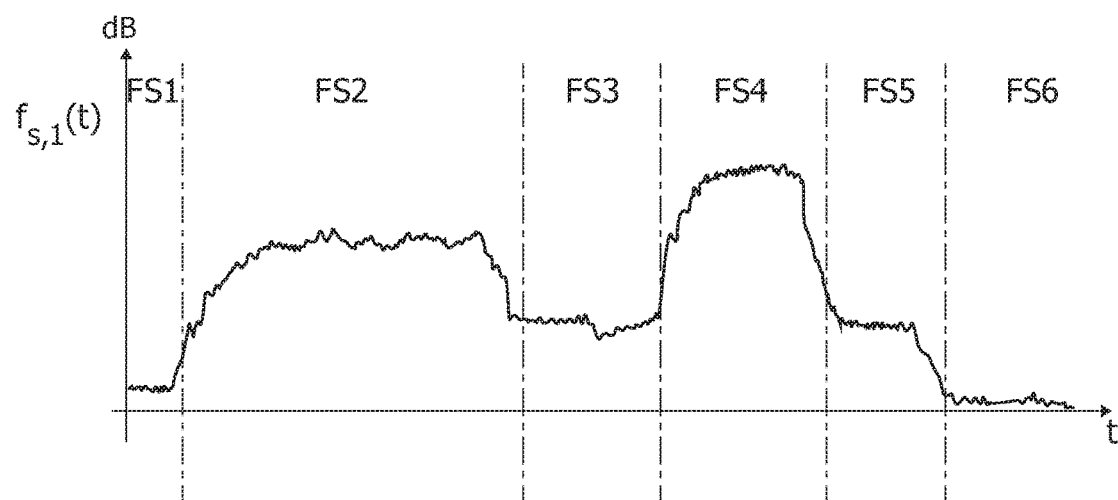
FIG. 8 exemplifies a possible time plot of an audio signal fs,i(t) representing the acoustic signature of an actuator or of a piece moving in a processing and/or assembly station.

For instance, the audio signal fs,1(*t*) exemplified in FIG. 8 may represent the behaviour of the actuator AT1 during a work cycle of the station ST. As a function of the known positions of the actuator AT1 during a work cycle of the station ST, which are provided by the signal fp,1(*t*) as exemplified in FIGS. 5A-D, the signal fs,1(*t*) may be built by concatenating respective portions of respective signals fa,(X,Y,Z)(t), i.e., by selecting, for each instant, the audio signal fa,(X,Y,Z)(t) of the voxel in which the actuator is located (as indicated by the signal fp,i(t)). In the present example, with reference to FIGS. 5A-D, the signal fs,1(*t*) may be built by concatenating in particular:

a portion of the signal fa,(1,1,1)(t), for t0≤t<t1
a portion of the signal fa,(1,1,2)(t), for t1≤t<t2
a portion of the signal fa,(1,1,3)(t), for t2≤t<t3
a portion of the signal fa,(1,1,4)(t), for t3≤t<t4
a portion of the signal fa,(1,2,4)(t), for t4≤t<t5
a portion of the signal fa,(1,2,3)(t), for t5≤t<t6
a portion of the signal fa,(1,1,3)(t), for t6≤t<t7
a portion of the signal fa,(1,1,2)(t), for t7≤t<t8
a portion of the signal fa,(1,1,1)(t), for t8≤t<t9.

In various embodiments, various techniques of composition of the signals fa,(X,Y,Z)(t) may be used for reconstructing signals fs,i(t).

For instance, various smoothing techniques may be adopted at the instants ti of "jump" between one signal fa,(X,Y,Z)(t) and another, for example considering an average of the two signals in a certain time interval at the transition between the two signals.

FIG. 8 shows by way of example a possible time plot of a signal fs,i(t), for instance, the signal fs,1(*t*) representing the behaviour of the actuator AT1 of the station ST. In a first interval FS1, the signal fs,1(*t*) may be characterised by a low intensity, which may be indicative of the fact that the actuator AT1 is in an idle state. A second interval FS2, characterised by a higher intensity of the signal fs,1(*t*), may be indicative of execution of a certain processing operation by the actuator AT1. In a third interval FS3, an intensity of the signal fs,1(*t*) intermediate between the intensities in the intervals FS1 and FS2 may be indicative of the fact that the actuator AT1 is moving from an initial position to another position. A high intensity of the signal fs,1(*t*) in the interval FS4 may be indicative of a second step in which the actuator AT1 executes a processing operation, whereas the intensities in the intervals FS5 and FS6 may be indicative of the fact that the actuator AT1 is moving back to its initial position and then stops in an idle condition, respectively.

FIG. 9 shows by way of example a method for processing audio signals fraw,i(t) detected in proximity to a processing station ST in order to produce audio signals fa,(X,Y,Z)(t) and/or audio signals fs,i(t) for monitoring the state of operation of the station ST.

In various embodiments, the monitoring system of a processing and/or assembly station ST acquires, during a monitoring interval corresponding for example to a work cycle of the station ST, at least one first sampled sequence of the audio signals fraw,i(t) in a condition of proper operation of the respective station ST, i.e., in the absence of errors (reference condition).

In various embodiments, at least one first sampled sequence of the audio signals fraw,i(t) is processed so as to determine at least one reference sequence of the audio signals fa,(X,Y,Z)(t) and/or at least one reference sequence of the audio signals fs,i(t) for the station ST.

In various embodiments, the monitoring system of the station ST then acquires at least one second sampled sequence of the audio signals fraw,i(t) during operation of the station (current or testing condition). In general, the signal is also in this case monitored during the same monitoring interval.

In various embodiments, at least one second sampled sequence of the audio signals fraw,i(t) is processed in order to determine at least one second sequence of the audio signals fa,(X,Y,Z)(t) and/or at least one second sequence of the audio signals fs,i(t).

In various embodiments, the comparison between reference sequences of the audio signals fa,(X,Y,Z)(t) and/or fs,i(t) and respective second sequences of the audio signals fa,(X,Y,Z)(t) and/or fs,i(t) may be used for determining at least one similarity index for each pair of audio signals fa,(X,Y,Z)(t) and/or fs,i(t), for example a frequency similarity index and/or a time similarity index and/or an amplitude similarity index.

For instance, a method as described in the Italian patent application No. 102017000048962 filed on May 5, 2017 by the present applicant, the description of which is incorporated herein by reference for this purpose, may be used in various embodiments to determine frequency similarity indices and/or time similarity indices between pairs of signals fa,(X,Y,Z)(t) and/or fs,i(t).

In various embodiments, an amplitude similarity index may be calculated, for example, as a ratio between an amplitude (which is instantaneous, or possibly averaged over a given time interval) of a reference sequence of a certain audio signal fa,(X,Y,Z)(t) and/or fs,i(t) and an amplitude of a respective second sequence of a given audio signal fa,(X,Y,Z)(t) and/or fs,i(t).

The values of similarity indices (frequency and/or time and/or amplitude similarity indices, or indices of some other type) between a reference sequence of an audio signal fa,(X,Y,Z)(t) and/or fs,i(t) and a respective second sequence of an audio signal fa,(X,Y,Z)(t) and/or fs,i(t) may be indicative of anomalies of operation of the processing and/or assembly station ST. For instance, if a given similarity index is lower than a certain first threshold or higher than a certain second threshold, an operating anomaly of the station ST can be detected.

In the case of similarity indices referring to a given pair of signals fa,(X0,Y0,Z0)(t), anomalies that occurred at a certain voxel V(X0,Y0,Z0) can be detected. For instance, it is possible to detect an operating anomaly in a voxel V(X0,Y0,Z0) and, by selecting that voxel V(X0,Y0,Z0) for a further analysis of the respective signals fa,(X0,Y0,Z0)(t), it is possible to determine the instant in time t0 of the work cycle of the station ST in which the anomaly occurs. Once a certain position V(X0,Y0,Z0) and a certain instant in time t0 have been determined, it is possible to determine an element of the station ST (for example, an actuator AT or a moving piece) that produces an audio signal indicating the aforesaid anomaly, i.e., an element that is located in that position V(X0,Y0,Z0) at the instant t0, for example by analysing the data supplied by the operating model of the station ST or by analysing the position signals fp,i(t).

In the case of similarity indices referring to a certain pair of signals fs,i(t), anomalies in a given element of the processing station ST (for example, an actuator AT or a moving piece) occurred at a given instant can be detected.

Hence, in various embodiments, analysis of audio signals detected in proximity to a processing and/or assembly station ST in a first reference condition and in one or more second operating conditions makes it possible to determine similarity indices between pairs of signals fa,(X,Y,Z)(t) and/or fs,i(t), these similarity indices indicating possible anomalies in operation of the elements of the station ST.

A monitoring system of a processing station ST according to the embodiments proves advantageous insofar as it facilitates recognition of anomalies that are hard to recognise even by skilled maintenance staff, thus facilitating implementation of "predictive" maintenance.

Moreover, a monitoring system as described herein facilitates recognition of a particular element of a processing station ST (for example, one particular actuator of the actuators AT) as source of the audio signal indicating an anomaly, providing indications on:

which element of the station ST produces an audio signal indicating an anomaly;

at which instant of the work cycle the aforesaid anomaly arises; and which position is occupied by the aforesaid element of the station when that anomaly arises.

The above set of information supplied by a monitoring system according to various embodiments proves advantageous insofar as it makes it possible to provide an estimate/evaluation of the severity of an operating anomaly of a station ST, possibly in an automatic way, as well as indicate a possible cause of the aforesaid anomaly, for example by correlating a certain anomaly in an audio signal to a specific movement of a given actuator of the station ST.

As mentioned repeatedly herein, it will be noted that, in various embodiments, the processing units MD, POS, MA and AU, indicated in FIG. 3A as distinct elements for simplicity of illustration, may be integrated in one or more processing units, possibly one of the processing units already present in the industrial plant 1, for example in a unit PLC or in a terminal SCADA. Likewise, the functions performed by the processing units MD, POS, MA, and AU may be implemented in a distributed way in a number of processing units of the industrial plant 1.

Without prejudice to the underlying principles, the details and the embodiments may vary, even appreciably, with respect to what has been described purely by way of example herein, without thereby departing from the sphere of protection and the scope of the present invention, as specified in the annexed claims.

What is claimed is:

1. A method of monitoring an operating state of a processing and/or assembly station of an industrial plant, the processing and/or assembly station comprising at least one actuator for moving at least one element, wherein at least one electronic control and processing unit exchange one or more signals with said processing and/or assembly station, in such a way that said processing and/or assembly station carries out a sequence of operations during a work cycle, the method comprising the steps of:

defining a plurality of limited regions of space at said processing and/or assembly station;

generating at least one position signal indicative of a respective position of said at least one moving element during said work cycle;

sensing, during said work cycle, first sampled sequences of a plurality of audio signals in a reference condition of said processing and/or assembly station via a plurality of audio sensors in proximity to said processing and/or assembly station;

determining, for each of said plurality of limited regions of space a respective reference sequence of an audio signal by processing said first sampled sequences of said plurality of audio signals;

sensing, during said work cycle, second sampled sequences of said plurality of audio signals in an operating condition of said processing and/or assembly station by said plurality of audio sensors in proximity to said processing and/or assembly station;

determining, for each of said plurality of limited regions of space, a respective second sequence of an audio signal by processing said second sampled sequences of said plurality of audio signals;

the method further comprising the steps of:

determining, for each of said plurality of limited regions of space, at least one similarity index by comparing the reference sequence associated to the respective limited region of space with the second sequence associated to the respective limited region of space;

identifying, for each of said respective limited regions of space, a detected operating anomaly of said assembly and/or processing station as a function of the respective at least one similarity index;

selecting at least one of said plurality of limited regions of space that comprises said detected anomaly and determining an instant in time when said detected anomaly occurs; and determining, as a function of said at least one position signal, one moving element out of said at least one moving element that is located in said selected one of said plurality of limited regions of space at the instant in time when said detected anomaly occurs, or the steps of:

determining, for each of said at least one moving element, a respective reference sequence of an audio signal by processing said reference sequences associated to the limited regions of space and said position signals;

determining, for each of said at least one moving element, a respective second sequence of an audio signal by processing said second sequences associated to the limited regions of space and said position signals;

determining, for each of said at least one moving element, at least one similarity index by comparing the reference sequence associated to the respective moving element with the second sequence associated to the respective moving element; and identifying, for each of said respective moving element, a detected operating anomaly as a function of the respective at least one similarity index.

2. The method of claim 1, wherein defining a plurality of limited regions of space at said processing and/or assembly station further comprises:

storing, in a memory area of said at least one electronic control and processing unit of said processing and/or assembly station, a three-dimensional model of a space occupied by said processing and/or assembly station, said three-dimensional model comprising a numerical representation of a set of said plurality of limited regions of space, wherein each of said plurality of limited regions of space comprise a voxels.

3. The method of claim 2 wherein each voxel comprises a cubic geometry.

4. The method according to claim 2, comprising generating and storing in a memory area of said at least one electronic control and processing unit of said processing and/or assembly station, an operating model of said processing and/or assembly station, said operating model comprising at least one signal indicative of an expected trajectory of movement of the at least one moving element in said processing and/or assembly station, by processing one of:
said signals exchanged between said at least one electronic control and processing unit and said processing and/or assembly station, or
operating data sent by said at least one electronic control and processing unit to said at least one processing unit.

5. The method according to claim 1, comprising generating and storing in a memory area of said at least one electronic control and processing unit of said processing and/or assembly station, an operating model of said processing and/or assembly station, said operating model comprising at least one signal indicative of an expected trajectory of movement of the at least one moving element in said processing and/or assembly station, by processing one of:
said signals exchanged between said at least one electronic control and processing unit and said processing and/or assembly station, or
operating data sent by said at least one electronic control and processing unit to said at least one processing unit.

6. The method according to claim 5, wherein generating said at least one position signal indicating the position of the at least one moving element comprises processing data from said operating model of said processing and/or assembly station and at least one clock signal included in said electronic control and processing unit.

7. The method according to claim 1, wherein generating said at least one position signal indicating the position of the at least one moving element comprises processing at least one signal exchanged between at least one actuator and said at least one electronic control unit and said at least one processing unit of said processing and/or assembly station.

8. The method according to claim 1, wherein generating said at least one position signal indicating the position of the at least one moving element comprises processing at least one signal exchanged between at least one sensor in said processing and/or assembly station and said at least one electronic control unit and said at least one processing unit of said processing and/or assembly station.

9. The method according to claim 1, wherein determining said reference sequence and said second sequence associated to said limited regions of space further comprises processing, respectively, said first and second sampled sequences of said plurality of audio signals using beam-forming techniques.

10. The method of claim 1, wherein said at least one similarity index between a reference sequence associated to a respective limited region of space and a second sequence associated to said respective limited region of space further comprises at least one of: a time similarity index, a frequency similarity index, or an amplitude similarity index.

11. The method of claim 1, wherein said at least one similarity index between a reference sequence associated to a respective moving element and a second sequence associated to said respective moving element further comprises at least one of: a time similarity index, a frequency similarity index, or an amplitude similarity index.

12. A system for monitoring the operating state of a processing and/or assembly station of an industrial plant, the processing and/or assembly station comprising at least one actuator for moving at least one element, wherein at least one electronic control and processing unit exchanges one or more signals with said processing and/or assembly station, in such a way that said processing and/or assembly station carries out a sequence of operations during a work cycle, wherein the monitoring system comprises at least one processing unit and a plurality of audio sensors arranged in proximity to said processing and/or assembly station configured for implementing the method according to claim 1.

13. A non-transitory computer-readable medium storing instructions that, when executed, cause a computing device to perform steps of the method according to claim 1.

* * * * *